(12) United States Patent
Guo

(10) Patent No.: US 11,411,821 B2
(45) Date of Patent: Aug. 9, 2022

(54) DRIVER UPGRADE METHOD AND DEVICE

(71) Applicant: HUAWEI TECHNOLOGIES CO., LTD., Guangdong (CN)

(72) Inventor: Yong Guo, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 22 days.

(21) Appl. No.: 16/929,336

(22) Filed: Jul. 15, 2020

(65) Prior Publication Data

US 2020/0351165 A1 Nov. 5, 2020

Related U.S. Application Data

(63) Continuation of application No. PCT/CN2019/071855, filed on Jan. 16, 2019.

(30) Foreign Application Priority Data

Jan. 17, 2018 (CN) .......................... 201810045407.4

(51) Int. Cl.
*H04L 41/08* (2022.01)
*G06F 8/65* (2018.01)
*H04L 41/082* (2022.01)
*H04L 41/0893* (2022.01)

(52) U.S. Cl.
CPC ............ *H04L 41/0889* (2013.01); *G06F 8/65* (2013.01); *H04L 41/082* (2013.01); *H04L 41/0893* (2013.01)

(58) Field of Classification Search
CPC .................................................. H04L 41/0889
See application file for complete search history.

(56) References Cited

U.S. PATENT DOCUMENTS

| | | | |
|---|---|---|---|
| 2017/0006083 A1 | 1/2017 | McDonnell | |
| 2017/0249136 A1* | 8/2017 | Anand | G06F 9/45558 |
| 2018/0316559 A1* | 11/2018 | Thulasi | H04L 41/00 |

FOREIGN PATENT DOCUMENTS

| | | |
|---|---|---|
| CN | 102662884 A | 9/2012 |
| CN | 104410672 A | 3/2015 |
| CN | 105471994 A | 4/2016 |
| CN | 106301876 A | 1/2017 |
| CN | 106325859 A | 1/2017 |

(Continued)

OTHER PUBLICATIONS

Office Action dated Feb. 6, 2020, issued in counterpart CN Application No. 201810045407.4, with English Translation. (12 pages).

(Continued)

*Primary Examiner* — Jeffrey R Swearingen
(74) *Attorney, Agent, or Firm* — WHDA, LLP

(57) ABSTRACT

A driver upgrade method and a device are provided, to simplify a driver upgrade process and improve upgrade efficiency. The driver upgrade method includes: receiving, by a MANO, first information from a VNF during an upgrade of the VNF, the first information indicating version information of the VNF after the upgrade; determining, by the MANO, that an NFVI is not upgraded; and sending, by the MANO, second information to the VNF, the second information indicating to the VNF not to upgrade a VF driver installed in the VNF.

18 Claims, 8 Drawing Sheets

(56) References Cited

FOREIGN PATENT DOCUMENTS

| CN | 106664242 A | 5/2017 |
|---|---|---|
| WO | 2017071169 A1 | 5/2017 |
| WO | 2017121153 A1 | 7/2017 |

OTHER PUBLICATIONS

International Search Report dated Apr. 17, 2019, issued in counterpart Application No. PCT/CN2019/071855, with English Translation. (11 pages).
Draft ETSI GS NFV-SWA 001 V0.2.3:"Network Functions Virtualisation (NFV); Virtual Network Functions Architecture",Oct. 2014,total 95 pages.
Extended (Supplementary) European Search Report dated Jan. 28, 2021, issued in counterpart EP Application No. 19741631.6. (10 pages).
Notice of Allowance dated Oct. 12, 2020, issued in counterpart CN Application No. 201810045407.4, with English Translation and Search Report. (11 Pages).

* cited by examiner

DRIVER UPGRADE METHOD AND DEVICE

CROSS-REFERENCE TO RELATED APPLICATIONS

This application is a continuation of International Application No. PCT/CN2019/071855, filed on Jan. 16, 2019, which claims priority to Chinese Patent Application No. 201810045407.4, filed on Jan. 17, 2018. The disclosures of the aforementioned applications are hereby incorporated by reference in their entireties.

TECHNICAL FIELD

This application relates to the field of communications technologies, and in particular, to a driver upgrade method and a device.

BACKGROUND

As a trend of network cloudification becomes clearer, the 3rd generation partnership project (3GPP) has launched the European telecommunications standards institute (ETSI) network functions virtualization (NFV) architecture. As a key technology, NFV gains wide attention from the communications industry. The standardization organization has conducted in-depth research on the NFV and applied the NFV to a plurality of phases of the industry chain.

Currently, for the NFV architecture, major vendors have launched a single-root I/O virtualization (SR-IOV) technology, to fulfill high-bandwidth and low-latency application features.

The SR-IOV technology is a hardware-based virtualization solution. An SR-IOV standard allows virtual machines to efficiently share a peripheral component interconnect express (PCIe) device, and SR-IOV is implemented in hardware, so that input/output (I/O) performance that is comparable to performance of a physical machine can be achieved.

During service change and evolution of an actual network, a virtualized network function (VNF) layer in the NFV architecture also needs to be upgraded based on a service requirement. Currently, for a VNF layer to which the SR-IOV technology is applied, when such a VNF layer is upgraded, a virtual function (VF) driver embedded in an image file of an operating system of the VNF layer is also upgraded. The VF driver is a part of an SR-IOV driver. The SR-IOV driver further includes a physical function (PF) driver. The PF driver is installed in a network functions virtualization infrastructure (NFVI) in the NFV architecture.

During actual deployment of an NFV solution, the NFVI and VNF layer that are included in the NFV architecture evolve independently. Because a resource is directly shared in hardware for the SR-IOV, a VF driver that matches a PF driver in the NFVI needs to be deployed at the VNF layer. Because the VNF layer is included in a virtual machine (VM), and the NFVI includes a physical network interface card (NIC), that the VF driver needs to match the PF driver for the SR-IOV may also be understood as version coupling between the VM and the physical network interface card (which may also be referred to as a physical NIC for short). Due to the version coupling between the VM and the physical NIC, the VF driver at the VNF layer and the PF driver in the NFVI need to be upgraded together. As described above, when the VNF layer is upgraded, the VF driver is also upgraded. Due to the version coupling between the VM and the physical NIC, the PF driver also needs to be upgraded. Currently, the PF driver is upgraded by upgrading the NFVI. If the VNF layer is upgraded, the NFVI also needs to be upgraded.

Consequently, an upgrade process is comparatively complex and time-consuming, and correspondingly, upgrade efficiency is comparatively low.

SUMMARY

Embodiments of this application provide a driver upgrade method and a device, to simplify a driver upgrade process and improve upgrade efficiency.

According to a first aspect, a driver upgrade method is provided. The method may be performed by MANO. The method includes: receiving, by the MANO, first information from a VNF during an upgrade of the VNF, where the first information is used to indicate version information of the VNF after the upgrade; determining, by the MANO, that a network functions virtualization infrastructure NFVI is not upgraded; and sending, by the MANO, second information to the VNF, where the second information is used to indicate to the VNF not to upgrade a virtual function VF driver installed in the VNF.

Correspondingly, according to a second aspect, a driver upgrade method is provided. The method may be performed by a VNF. The method includes: sending, by the VNF, first information to MANO during an upgrade of the VNF, where the first information is used to indicate version information of the VNF after the upgrade; receiving, by the VNF, second information from the MANO, where the second information is used to indicate the VNF not to upgrade a VF driver installed in the VNF; and activating, by the VNF, a first version of the VF driver based on the second information, where the first version is a version before the VF driver is upgraded.

In this embodiment of this application, the VF driver does not need to be upgraded together with the VNF layer, and may be independently upgraded. During the upgrade of the VNF, if the MANO determines that the NFVI is not upgraded, that is, determines that a PF driver is not upgraded, the MANO may indicate the VNF layer not to upgrade the VF driver, to ensure that a version of the PF driver can match that of the VF driver. In this way, the upgrade of the VNF layer can be independent of that of the VF driver in some degree. The VF driver does not need to be upgraded during the upgrade of the VNF layer, so that the NFVI does not need to be upgraded. Therefore, the NFVI or VNF layer can be independently upgraded, no associated upgrade is required, NFV operation and maintenance on an existing network is simplified, and upgrade efficiency is improved.

In a possible design, before the receiving, by the MANO, first information from a VNF, the method further includes: uploading, by the MANO, a new version of an image file to the VNF, where the VF driver is not embedded in the new version of the image file. Correspondingly, before the sending, by the VNF, first information to MANO, the method further includes: receiving, by the VNF, a new version of an image file from the MANO, where the VF driver is not embedded in the new version of the image file.

In this embodiment of this application, the VF driver may be separated from an image file of a VM, for example, by the VNF. In this way, the VF driver and the image file of the VM can be separately released, to facilitate independent loading of the VF driver. In this case, a separate image file may be uploaded to the MANO, and no VF driver needs to be embedded in the image file. This can reduce an amount of transmitted information.

In a possible design, after the receiving, by the MANO, first information from a VNF, the method further includes: updating, by the MANO, a matching relationship between a VNFD and the VNF, where the VNFD matches the VNF in the updated matching relationship.

The MANO may update the matching relationship between the VNFD and the VNF, and establish the matching relationship between the VNFD and the VNF, to facilitate a subsequent operation.

In a possible design, the second information carries information about a second version, the second version is a version of a physical function PF driver installed in the NFVI, and the activating, by the VNF, a first version of the VF driver based on the second information includes: determining, by the VNF, the first version that is in one or more versions of the VF driver and that matches the second version; and activating, by the VNF, the first version of the VF driver.

The VNF may know a plurality of versions of the VF driver. In this case, the VNF needs to select, for activation, the version that matches the second version, so that the VF driver can match the PF driver.

According to a third aspect, a driver upgrade method is provided. The method may be performed by MANO. The method includes: determining, by the MANO, that a PF driver installed in an NFVI is upgraded, and determining version information of the PF driver after the upgrade; determining, by the MANO based on the version information of the PF driver after the upgrade, that a VF driver installed in a VNF should be upgraded to a first version; and initiating, by the MANO for a VNF, an operation of upgrading the VF driver installed in the VNF to the first version.

In this embodiment of this application, if the PF driver is upgraded, the VF driver may be upgraded. The VNF does not need to be upgraded while the VF driver is upgraded. This reduces a time required for the upgrade, and satisfies a requirement that the PF driver matches the VF driver.

In a possible design, the determining, by the MANO, that a PF driver installed in an NFVI is upgraded includes: determining, by the MANO, that the NFVI is upgraded; or determining, by the MANO, that the NFVI is not upgraded, but the PF driver is upgraded.

The PF driver may be upgraded together with the NFVI. Therefore, if the NFVI is upgraded, the MANO can determine that the PF driver is upgraded. Alternatively, the PF driver may be upgraded alone. Therefore, the MANO may separately determine whether the PF driver is upgraded.

In a possible design, the method further includes: adding, by the MANO, information about the first version to a VNFD.

The MANO may update a matching relationship between the VNFD and the VNF, and establish the matching relationship between the VNFD and the VNF, to facilitate a subsequent operation.

According to a fourth aspect, MANO is provided. The MANO has functions of implementing the MANO in the foregoing method designs. The functions may be implemented by hardware, or may be implemented by hardware executing corresponding software. The hardware or software includes one or more units corresponding to the functions.

In a possible design, a specific structure of the MANO may include a processor and a transceiver. The processor and the transceiver may perform corresponding functions in the method according to the first aspect or any possible design of the first aspect.

According to a fifth aspect, a VNF is provided. The VNF has functions of implementing the VNF in the foregoing method designs. The functions may be implemented by hardware, or may be implemented by hardware executing corresponding software. The hardware or software includes one or more units corresponding to the functions.

In a possible design, a specific structure of the VNF may include a processor and a transceiver. The processor and the transceiver may perform corresponding functions in the method according to the second aspect or any possible design of the second aspect.

According to a sixth aspect, MANO is provided. The MANO has functions of implementing the MANO in the foregoing method designs. The functions may be implemented by hardware, or may be implemented by hardware executing corresponding software. The hardware or software includes one or more units corresponding to the functions.

In a possible design, a specific structure of the MANO may include a processor, and optionally, may further include a transceiver. The processor and the transceiver may perform corresponding functions in the method according to the third aspect or any possible design of the third aspect.

According to a seventh aspect, MANO is provided. The MANO has functions of implementing the MANO in the foregoing method designs. The functions may be implemented by hardware, or may be implemented by hardware executing corresponding software. The hardware or software includes one or more units corresponding to the functions.

In a possible design, a specific structure of the MANO may include a processing module and a transceiver module. The processing module and the transceiver module may perform corresponding functions in the method according to the first aspect or any possible design of the first aspect.

According to an eighth aspect, a VNF is provided. The VNF has functions of implementing the VNF in the foregoing method designs. The functions may be implemented by hardware, or may be implemented by hardware executing corresponding software. The hardware or software includes one or more units corresponding to the functions.

In a possible design, a specific structure of the VNF may include a processing module and a transceiver module. The processing module and the transceiver module may perform corresponding functions in the method according to the second aspect or any possible design of the second aspect.

According to a ninth aspect, MANO is provided. The MANO has functions of implementing the MANO in the foregoing method designs. The functions may be implemented by hardware, or may be implemented by hardware executing corresponding software. The hardware or software includes one or more units corresponding to the functions.

In a possible design, a specific structure of the MANO may include a processing module, and optionally, may further include a transceiver module. The processing module and the transceiver module may perform corresponding functions in the method according to the third aspect or any possible design of the third aspect.

According to a tenth aspect, a communications apparatus is provided. The communications apparatus may be the MANO in the foregoing method designs, or may be a chip disposed in the MANO. The communications apparatus includes a memory, configured to store computer-executable program code; and a processor, where the processor is coupled to the memory. The program code stored in the memory includes an instruction. When the processor executes the instruction, the communications apparatus is enabled to perform the method performed by the MANO according to the first aspect or any possible design of the first aspect.

According to an eleventh aspect, a communications apparatus is provided. The communications apparatus may be the VNF in the foregoing method designs, or may be a chip disposed in the VNF. The communications apparatus includes a memory, configured to store computer-executable program code; and a processor, where the processor is coupled to the memory. The program code stored in the memory includes an instruction. When the processor executes the instruction, the communications apparatus is enabled to perform the method performed by the VNF according to the second aspect or any possible design of the second aspect.

According to a twelfth aspect, a communications apparatus is provided. The communications apparatus may be the MANO in the foregoing method designs, or may be a chip disposed in the MANO. The communications apparatus includes a memory, configured to store computer-executable program code; and a processor, where the processor is coupled to the memory. The program code stored in the memory includes an instruction. When the processor executes the instruction, the communications apparatus is enabled to perform the method performed by the MANO according to the third aspect or any possible design of the third aspect.

According to a thirteenth aspect, a communications system is provided. The communications system includes MANO and a VNF. The MANO is configured to receive first information from the VNF during an upgrade of the VNF, where the first information is used to indicate version information of the VNF after the upgrade; determine that an NFVI is not upgraded; and send second information to the VNF, where the second information is used to indicate to the VNF not to upgrade a VF driver installed in the VNF. The VNF is configured to send the first information to the MANO during the upgrade of the VNF, where the first information is used to indicate the version information of the VNF after the upgrade; receive the second information from the MANO, where the second information is used to indicate to the VNF not to upgrade the VF driver installed in the VNF; and activate a first version of the VF driver based on the second information, where the first version is a version before the VF driver is upgraded.

According to a fourteenth aspect, a computer storage medium is provided. The computer-readable storage medium stores an instruction. When the instruction is run on a computer, the computer is enabled to perform the method according to the first aspect or any possible design of the first aspect.

According to a fifteenth aspect, a computer storage medium is provided. The computer-readable storage medium stores an instruction. When the instruction is run on a computer, the computer is enabled to perform the method according to the second aspect or any possible design of the second aspect.

According to a sixteenth aspect, a computer storage medium is provided. The computer-readable storage medium stores an instruction. When the instruction is run on a computer, the computer is enabled to perform the method according to the third aspect or any possible design of the third aspect.

According to a seventeenth aspect, a computer program product including an instruction is provided. The computer program product stores the instruction. When the computer program product runs on a computer, the computer is enabled to perform the method according to the first aspect or any possible design of the first aspect.

According to an eighteenth aspect, a computer program product including an instruction is provided. The computer program product stores the instruction. When the computer program product runs on a computer, the computer is enabled to perform the method according to the second aspect or any possible design of the second aspect.

According to a nineteenth aspect, a computer program product including an instruction is provided. The computer program product stores the instruction. When the computer program product runs on a computer, the computer is enabled to perform the method according to the third aspect or any possible design of the third aspect.

According to the solutions provided in the embodiments of this application, the upgrade of the VNF can be independent of that of the NFVI. The NFVI or VNF can be independently upgraded, no associated upgrade is required, and NFV operation and maintenance on the existing network is simplified.

DESCRIPTION OF EMBODIMENTS

Figure 1:
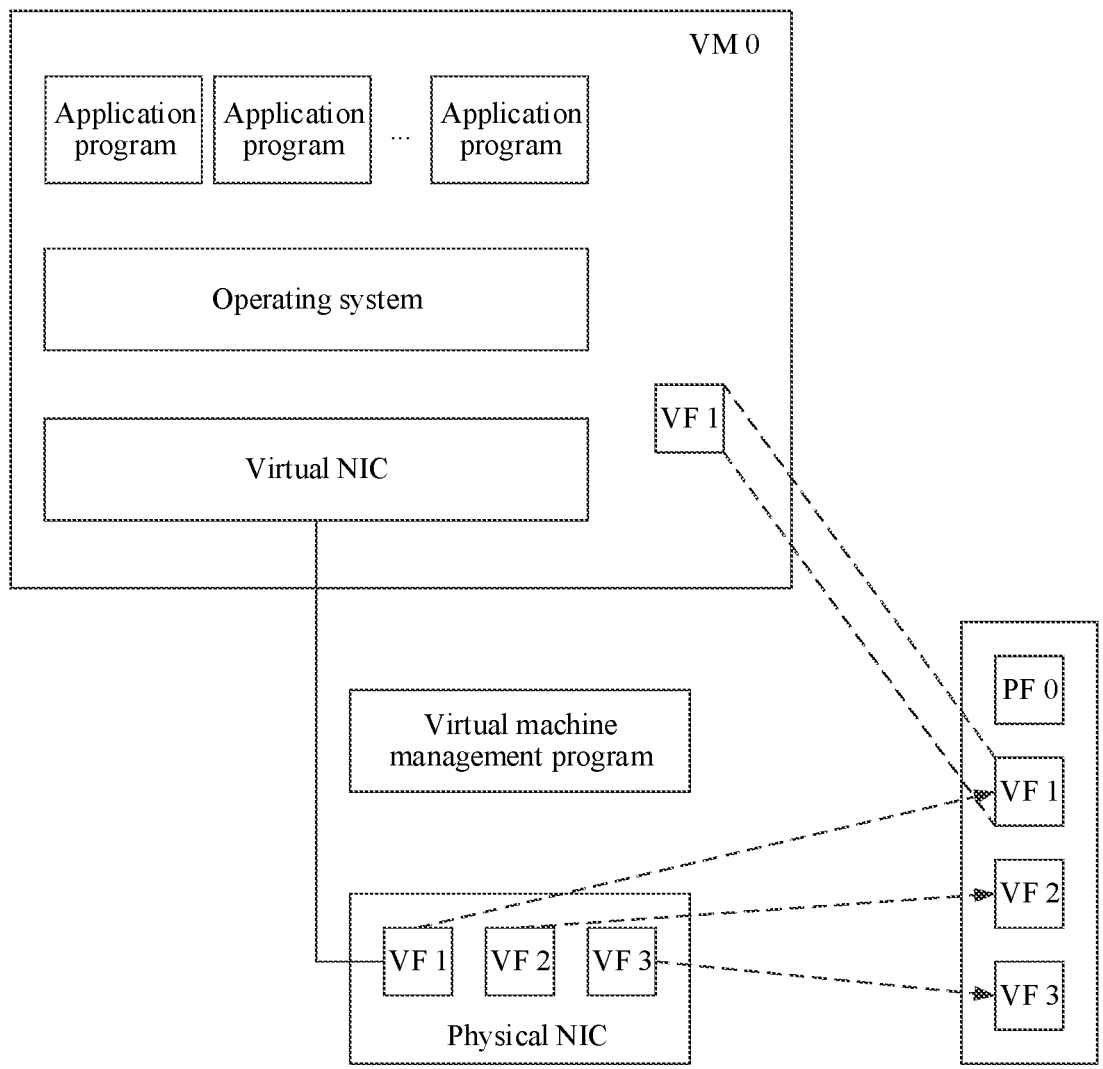
FIG. 1 is a schematic diagram of an SR-IOV technology.

To make the objectives, technical solutions, and advantages of the embodiments of the present invention clearer, the following further describes the embodiments of the present invention in detail with reference to the accompanying drawings.

The following describes some terms in the embodiments of this application, to facilitate understanding of a person skilled in the art.

(1) The NFV industry standard group (ISG) is initiated by 13 major telecom operators worldwide and involves many equipment vendors, information technology (IT) vendors, and the like. The NFV ISG is to define network function virtualization requirements of the operators and related technical reports, and expects to utilize an IT virtualization technology and general-purpose high-performance and large-capacity servers, switches, and storage devices to implement some software-based network functions. For example, for various network devices such as a server, a router, a storage device, a content delivery network (CDN), or a switch, separation between software and hardware can be implemented by using an NFV technology, and the network devices may be deployed in a data center, a network node, a user's house, or the like.

The NFV technology mainly includes three parts: a VNF layer, an NFVI, and MANO (NFV management and orchestration).

The VNF layer is a VNF set that shares a same physical open table service (OTS) server. The VNF set corresponds to software implementation of network element functions, for example, logical implementation of an evolved packet core (EPC) network element, an internet protocol (IP) multimedia subsystem (IMS) network element, and the like.

An NFVI may be understood as an infrastructure layer. The NFVI is a resource pool from a perspective of cloud computing. The NFVI needs to convert a physical computing/storage/switching resource pool to a virtual computing/storage/switching resource pool through virtualization. When mapped to a physical infrastructure, the NFVI corresponds to a plurality of geographically distributed data centers that are connected over a high-speed communications network.

The NFV MANO (MANO for short in the following) is based on different service level agreements (SLAs). A MANO operation support layer is responsible for "fairly" allocating physical resources, and is also responsible for redundancy management, error management, flexible adjustment, and the like, and may be equivalent to a current operations support system (OSS)/business support system (BSS).

(2) An SR-IOV technology is a hardware-based virtualization solution. An SR-IOV standard allows virtual machines to efficiently share a PCIe device, and SR-IOV is implemented in hardware, so that I/O performance that is comparable to performance of a physical machine can be achieved.

The SR-IOV technology is implemented by a PF and a VF.

The PF is configured to support a peripheral component interconnect (PCI) function of an SR-IOV function. The PF includes an SR-IOV function structure, and is used to manage the SR-IOV function. The PF is a full-featured PCIe function and can be discovered, managed, and processed like any other PCIe device. The PF has full-configuration resources and can be used to configure or control the PCIe device.

The VF is a function associated with the PF. The VF is a lightweight PCIe function that may share one or more physical resources with the PF and other VFs associated with the same PF. The VF is allowed to have configuration resources used only for its own actions. The VF may be obtained by extending the PF, and the PF may be extended to obtain a plurality of VFs. Each SR-IOV device may have one PF. Currently, a maximum of 64,000 VFs may be associated with each PF. The PF may use registers to create the VFs, and the registers are designed with properties specially used for this purpose. In addition, one VF corresponds to one virtual network interface card (which may also be referred to as a virtual NIC for short). One virtual NIC may be used by one VM.

FIG. 1 is a schematic diagram of an SR-IOV technology. In FIG. 1, a PF 0 is extended to obtain three VFs, namely, a VF 1, a VF 2, and a VF 3. The VF 1 is used by a physical NIC to communicate with a VM 0. The VM 0 includes a virtual NIC, an operating system, and some application programs. VMs corresponding to the VF 2 and the VF 3 are not shown in FIG. 1.

It can be learned that after the SR-IOV technology is enabled, the physical NIC can communicate with a VM via a VF, and the VM also can communicate with the physical NIC via the VF.

(3) The terms "upgrade" and "update" may be interchangeably used in the embodiments of this application. "A plurality of" means two or more. In view of this, "a plurality of" may also be understood as "at least two" in the embodiments of this application. The term "and/or" is an association relationship for describing associated objects and indicates that three relationships may exist. For example, A and/or B may indicate the following three cases: Only A exists, both A and B exist, and only B exists. In addition, the character "/" generally indicates an "or" relationship between the associated objects.

In addition, unless otherwise stated, ordinal numbers, such as "first" and "second", mentioned in the embodiments of this application are intended to distinguish between a plurality of objects, but are not intended to limit a sequence, a time sequence, priorities, or importance levels of the plurality of objects.

To better understand the technical solutions provided in the embodiments of this application, the following first describes the technical background of the embodiments of this application. Currently, for an NFV architecture, major vendors have launched an SR-IOV forwarding technology, to fulfill high-bandwidth and low-latency application features.

During service change and evolution of an actual network, a VNF layer in the NFV architecture also needs to be upgraded based on a service requirement. Currently, for a VNF layer to which the SR-IOV technology is applied, when such a VNF layer is upgraded, a VF driver embedded in an image file of an operating system of the VNF layer is also upgraded. The VF driver is a part of an SR-IOV driver. The SR-IOV driver further includes a PF driver. The PF driver is installed in an NFVI in the NFV architecture.

During actual deployment of an NFV solution, the NFVI and VNF layer that are included in the NFV architecture evolve independently. Because a resource is directly shared in hardware for the SR-IOV, a VF driver that matches a PF driver in the NFVI needs to be deployed at the VNF layer. Because the VNF layer is included in a VM, and the NFVI includes a physical NIC, that the VF driver needs to match the PF driver for the SR-IOV may also be understood as version coupling between the VM and the physical NIC. Due to the version coupling between the VM and the physical NIC, the VF driver at the VNF layer and the PF driver in the NFVI need to be upgraded together. As described above, when the VNF layer is upgraded, the VF driver is also upgraded. Due to the version coupling between the VM and the physical NIC, the PF driver also needs to be upgraded. Currently, the PF driver is upgraded by upgrading the NFVI. If the VNF layer is upgraded, the NFVI also needs to be upgraded.

Figure 2:
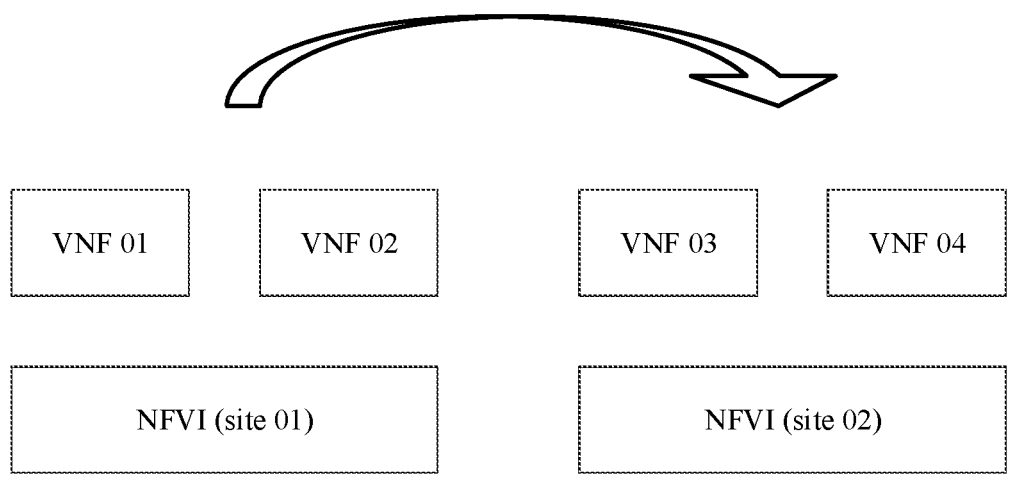
FIG. 2 shows service migration performed before a VNF and an NFVI are upgraded.

Referring to FIG. 2, for example, an NFVI at a site 01 and a VNF layer carried by the NFVI at the site 01 need to be upgraded. A process of upgrading the VNF layer and the NFVI is described as follows:

1. When the NFVI at the site 01 is upgraded, first migrate services of a VNF 01 and a VNF 02 to a VNF 03 and/or a VNF 04 on an NFVI at a site 02.

2. Upgrade the VNF layer, including upgrading the VNF 01 and the VNF 02. An image file of an operating system of the VNF layer and a VF driver embedded in the image file are upgraded together with the VNF layer. In this case, because a version of the VF driver does not match that of a PF driver, communication between VNFs is temporarily unavailable.

3. Upgrade the NFVI, where the PF driver is upgraded together with the NFVI. After the upgrade is completed, the version of the VF driver matches that of the PF driver, and the communication between the VNFs is restored.

4. After both the VNF layer and the NFVI are upgraded, migrate the services that have been migrated to the VNF 03 and/or the VNF 04 back to the respective VNFs on the NFVI at the site 01.

It can be learned that the VNF layer and the NFVI need to be upgraded together, the upgrade process is comparatively complex and time-consuming. Especially when there are a comparatively large quantity of VNFs, because all the VNFs need to be upgraded, a longer time is required. Correspondingly, upgrade efficiency is comparatively low. In addition, the VNF layer and the NFVI can access a service only after the entire upgrade is completed. In this period, the service is migrated to another VNF for running. Consequently, load of the another VNF is comparatively heavy, and a network is at high risk for a long time.

In view of this, the technical solutions in the embodiments of this application can cancel a strong coupling relationship between the VNF layer and the NFVI in some degree, so that the VNF layer and the NFVI can be independently upgraded, a time required for one upgrade is reduced, and upgrade efficiency is improved. In addition, because the time required for the upgrade is reduced, a service migrated to another site can be migrated back as soon as possible. This helps reduce load of the another site as soon as possible and reduce a network risk rate.

The embodiments of this application may be applicable to an NFV architecture to which an SR-IOV technology is applied, and certainly are not limited thereto. For example, the embodiments of this application may alternatively be applicable to another network architecture to which the SR-IOV technology is applied.

Figure 3:
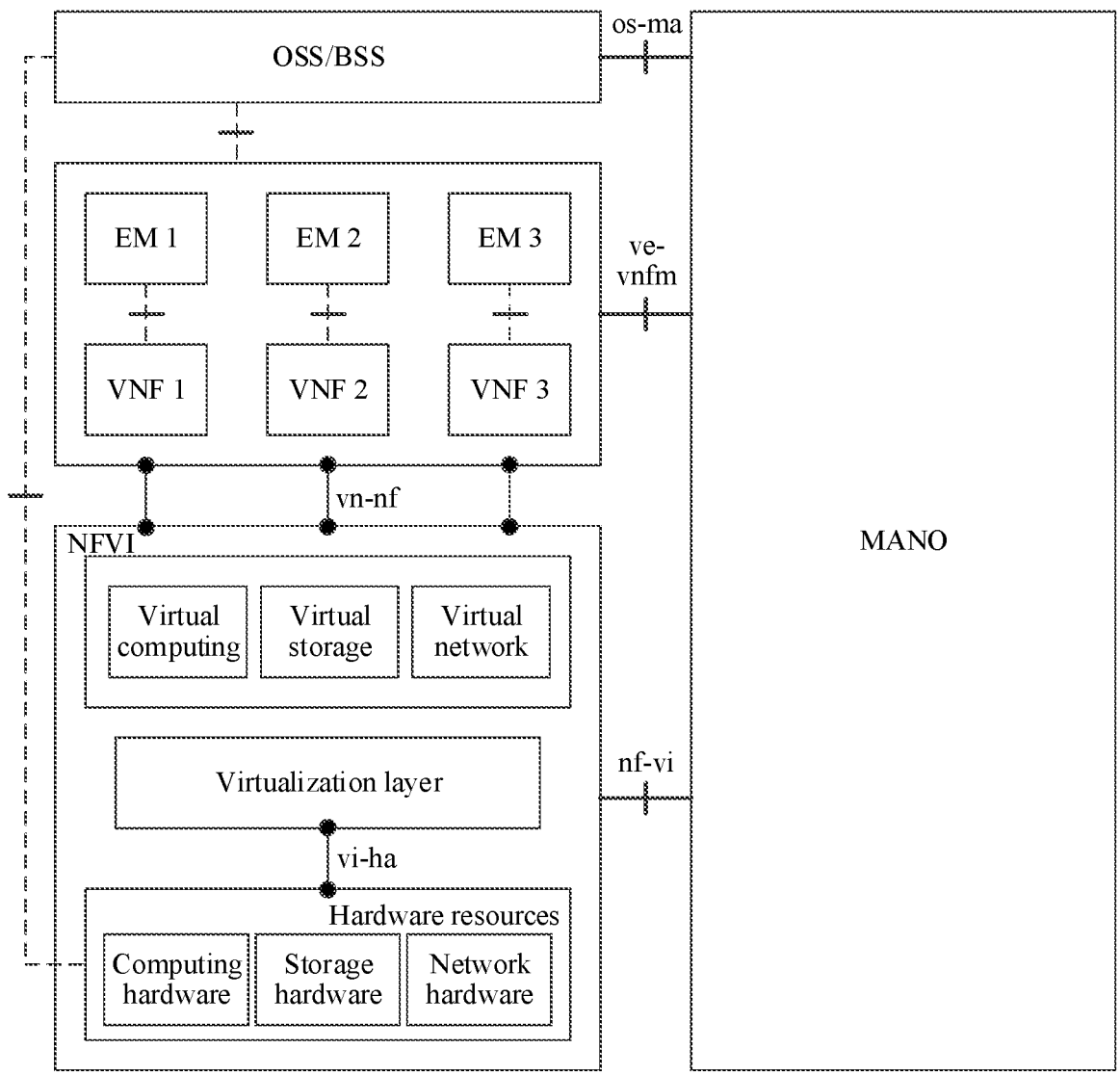
FIG. 3 is a schematic diagram of an application scenario according to an embodiment of this application.

FIG. 3 shows an application scenario according to an embodiment of this application, and is a schematic diagram of an NFV architecture. An OSS/BSS, MANO, a VNF layer, and an NFVI are included in FIG. 3. For example, the VNF layer includes three VNFs: a VNF 1, a VNF 2, and a VNF 3. A quantity of VNFs is not limited in actual application. The VNF 1 corresponds to an element manager (EM) 1, the VNF 2 corresponds to an EM 2, and the VNF 3 corresponds to an EM 3. The VNF layer communicates with the OSS/BSS at an upper layer, and can communicate with the NFVI at a lower layer. All the VNFs included in the VNF layer can communicate with the NFVI.

The NFVI includes a virtualization layer, functions such as virtual computing, virtual storage, and a virtual network that are above the virtualization layer, and hardware resources including computing hardware, storage hardware, and network hardware that are below the virtualization layer. The hardware resources may be implemented by a physical NIC. os-ma is responsible for VNF life cycle management, service graph life cycle management, policy management, and the like. Ve-Vnfm is responsible for VNF life cycle management, configuration information exchange, and the like. nf-vi is responsible for specific resource allocation, virtual resource status information exchange, hardware resource configuration, and the like. vn-nf is used by the NFVI to provide an actual execution environment for a VNF. vi-ha is used to connect the virtualization layer and the hardware resources.

On an actual network, the MANO may include corresponding devices, which are not shown one by one in FIG. 3.

Figure 4:
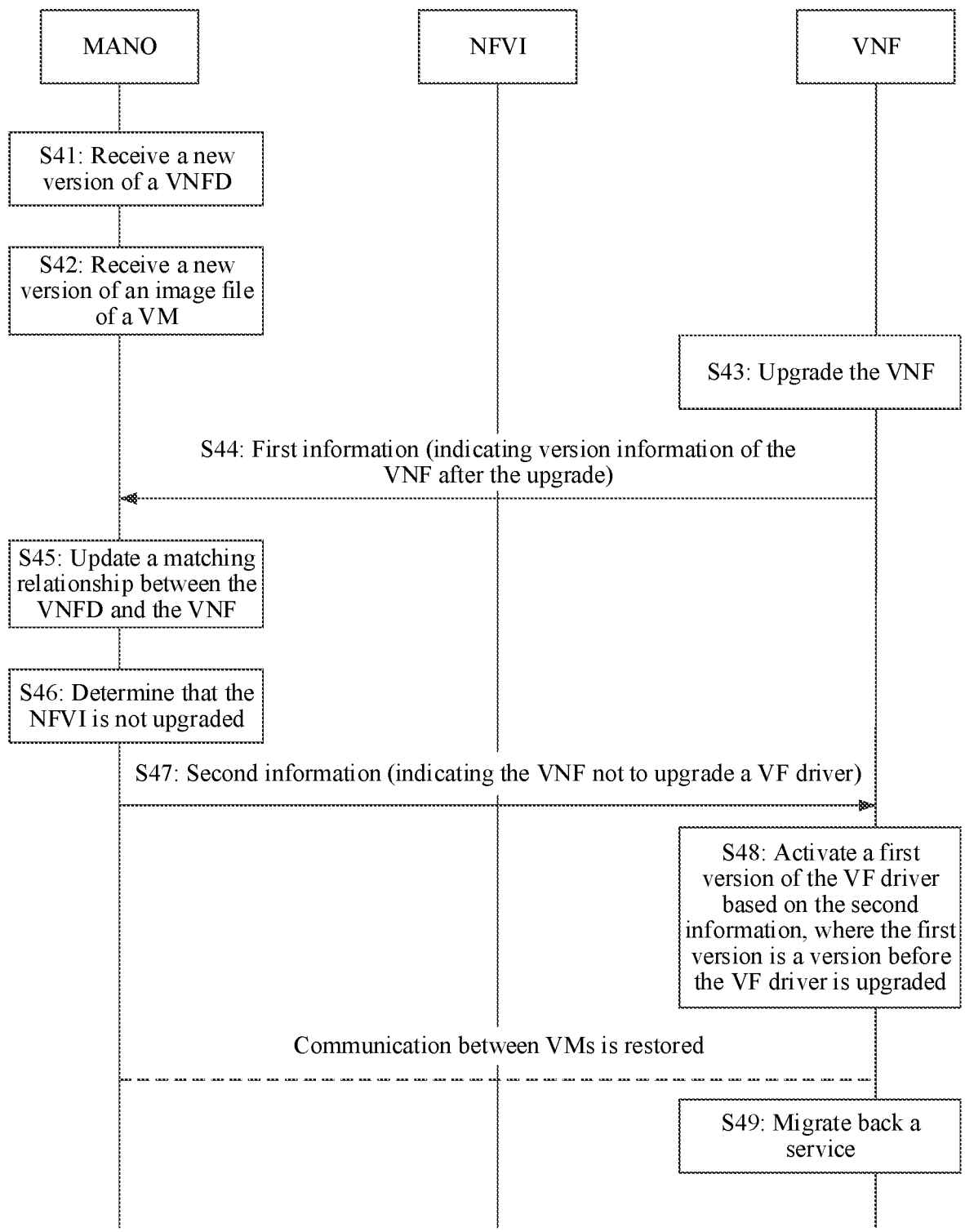
FIG. 4 is a flowchart of a driver upgrade method according to an embodiment of this application.

Referring to FIG. 4, an embodiment of this application provides a first driver upgrade method. In the following description process, for example, the method is applied to the application scenario shown in FIG. 3. A procedure of the method is described as follows:

In this embodiment of this application, one VNF may be upgraded alone, or a plurality of VNFs may need to be upgraded. If the plurality of VNFs need to be upgraded, the plurality of VNFs may be upgraded serially or concurrently. Because an upgrade process of each VNF is similar, in this embodiment of this application, one VNF is used as an example to describe the upgrade process of the VNF.

A service is interrupted during an upgrade of a VNF. Therefore, before the upgrade, an operator first migrates the service of the to-be-upgraded VNF to another site. For example, the operator may migrate the service of the to-be-upgraded VNF to a VNF on another NFVI, or to another VNF that is on a same NFVI and that is temporarily not upgraded. VNFs on one NFVI may all use an SR-IOV technology. Alternatively, some of the VNFs may use the SR-IOV technology, and the others may not use the SR-IOV technology. In an example, the VNF that is on the same NFVI and that is temporarily not upgraded may not use the SR-IOV technology.

S41: A new version of a virtualized network function descriptor (VNFD) is uploaded to MANO, and the MANO receives the new version of the VNFD.

The new version of the VNFD describes version information of a VF driver that can be supported by software of a VNF. For example, the new version of the VNFD may describe a matching relationship between a software version of the VNF and a version of the VF driver by using a plan file. As defined in the ETSI NFV standard, a field may be customized in the plan file included in the VNFD. The matching relationship between the software version of the VNF and the version of the VF driver is recorded in the plan file, to facilitate a subsequent update operation. Certainly, the matching relationship between the software version of the VNF and the version of the VF driver may alternatively be recorded in another file in the VNFD, for example, recorded in a blueprint file. This is not limited in this embodiment of this application.

For example, the new version of the VNFD may be uploaded to the MANO by an operator or a corresponding device.

S42: A new version of an image file of a VM is uploaded to the MANO, and the MANO receives the image file. The image file includes functions such as VF driver check and VF driver loading.

In this embodiment of this application, the VF driver may be separated from the image file of the VM, for example, by the VNF. In this way, the VF driver and the image file of the VM can be separately released, to facilitate independent loading of the VF driver. In S42, a separate image file may be uploaded to the MANO, and no VF driver is embedded in the image file. This can reduce an amount of transmitted information.

Certainly, if the VF driver is not separated from the image file of the VM, the VF driver is still embedded in the new version of the image file uploaded to the MANO in S42. In this case, a version of the embedded VF driver may be a version before an upgrade.

S43: Upgrade the VNF by using an upgrade tool provided by the VNF.

S41 to S43 are optional steps. In addition, S41 to S43 may be performed by the operator or the corresponding device.

S44: During the upgrade of the VNF, the VNF actively sends first information to the MANO, and the MANO receives the first information from the VNF, where the first information is used to indicate version information of the VNF after the upgrade.

S45: The MANO actively updates a matching relationship between the VNFD and the VNF, and perceives an upgrade action of the VNF, where the VNFD matches the VNF in the updated matching relationship.

For example, the VNFD is stored in a database of the MANO, and the MANO may update the matching relationship between the VNFD and the VNF in the database of the MANO.

The VNFD uploaded in S41 is a general description file, and therefore has no relationship with any VNF. The VNF sends the first information to the MANO in S44, and the MANO may determine that there is a matching relationship between the VNFD and the VNF that sends the first information. The VNFD may be used to describe information such as an upgrade environment of the VNF. Therefore, the MANO may update the matching relationship between the VNFD and the VNF, and establish the matching relationship between the VNFD and the VNF.

S46: The MANO determines, by interacting with an NFVI, that the NFVI is not upgraded.

S45 and S46 are optional steps.

S47: The MANO sends second information to the VNF, and the VNF receives the second information, where the second information is used to indicate to the VNF not to upgrade the VF driver. In other words, the second information is used to indicate to the VNF not to change a current version number of the VF driver.

Because the NFVI is not upgraded, a PF driver is not upgraded. If the VF driver is upgraded, the VF driver may not match the PF driver. Therefore, the MANO may indicate to the VNF not to upgrade the VF driver, so that the VF driver keeps an original version, to match the PF driver that is not upgraded. This ensures that the VNF and the NFVI can still properly work when the NFVI is not upgraded.

It can be learned that in this embodiment of this application, the upgrade of the VF driver may be independent of that of the VNF. If the NFVI is not upgraded when the VNF is upgraded, the VF driver does not need to be upgraded, to ensure that the VF driver matches the PF driver. A requirement of upgrading the VNF is satisfied, and the upgraded VNF and the NFVI that is not upgraded can still match each other to complete work. This simplifies the upgrade process and improves upgrade efficiency.

S48: The VNF activates a first version of the VF driver based on the second information, where the first version is a version before the VF driver is upgraded.

In an example, the second information may further carry version information of the VF driver that should be used by the VNF. For example, the second information carries information about the first version. Alternatively, the second information may further carry current version information of the PF driver. For example, a current version of the PF driver is a second version. In this case, the second information carries information about the second version.

The MANO may determine the current version of the PF driver, for example, the second version, by interacting with the NFVI. In this case, the MANO may directly send the second information carrying the information about the second version to the VNF, and the VNF determines a version of the VF driver. Alternatively, the MANO may send, based on the first version of the VF driver that matches the second version of the PF driver, the second information carrying the information about the first version to the VNF. A specific implementation for the MANO is not limited in this embodiment of this application.

If the second information carries the information about the first version, the VNF may directly determine to activate the first version of the VF driver. If the second information carries the information about the second version, the VNF may determine a version of the VF driver that matches the second version. For example, the VNF determines that the first version of the VF driver can match the second version of the PF driver, and the VNF determines to activate the first version of the VF driver.

The second information indicates the VNF not to upgrade the VF driver, indicates the VNF not to change the current version number of the VF driver, indicates the version information of the VF driver that should be used by the VNF (that is, the second information carries the information about the first version), and indicates the version information of the PF driver (that is, the second information carries the information about the second version). It may be understood that the four indication manners have a same meaning. For example, the second information indicates that the version information of the VF driver that should be used by the VNF is the first version; or the second information indicates that the version of the PF driver is the second version, and the VNF determines that the first version of the VF driver matches the second version of the PF driver. In addition, the first version is the version before the VF driver is upgraded. That is, the second information indicates the VNF not to upgrade the VF driver, or indicates the VNF not to change the current version number of the VF driver.

After determining that the version of the VF driver is the first version, the VNF checks whether the first version is a correct version of the VF driver. For example, if the first version is a version of the VF driver that is supported by the upgraded VNF, the VNF determines that the first version is the correct version of the VF driver. If the VNF determines that the first version is the correct version of the VF driver, the VNF may activate the first version of the VF driver.

After the VNF activates the first version of the VF driver, a monitoring system may find that communication between VMs is restored.

S49: Migrate back a service. To be specific, the service of the VNF migrated to another site is migrated back to the VNF.

S49 may be performed by the operator or the corresponding device, for example, the VNF. If S49 is performed by the operator, for example, the operator may migrate back the service after a service interworking test.

S49 is an optional step.

Until now, the upgrade of the VNF is completed. In this process, the NFVI does not need to be upgraded together with the VNF, to reduce a time required for the upgrade. The service migrated due to the upgrade can be migrated back as soon as possible. This minimizes a time for the another site to carry excessive services and reduces a network risk rate.

Figure 5:
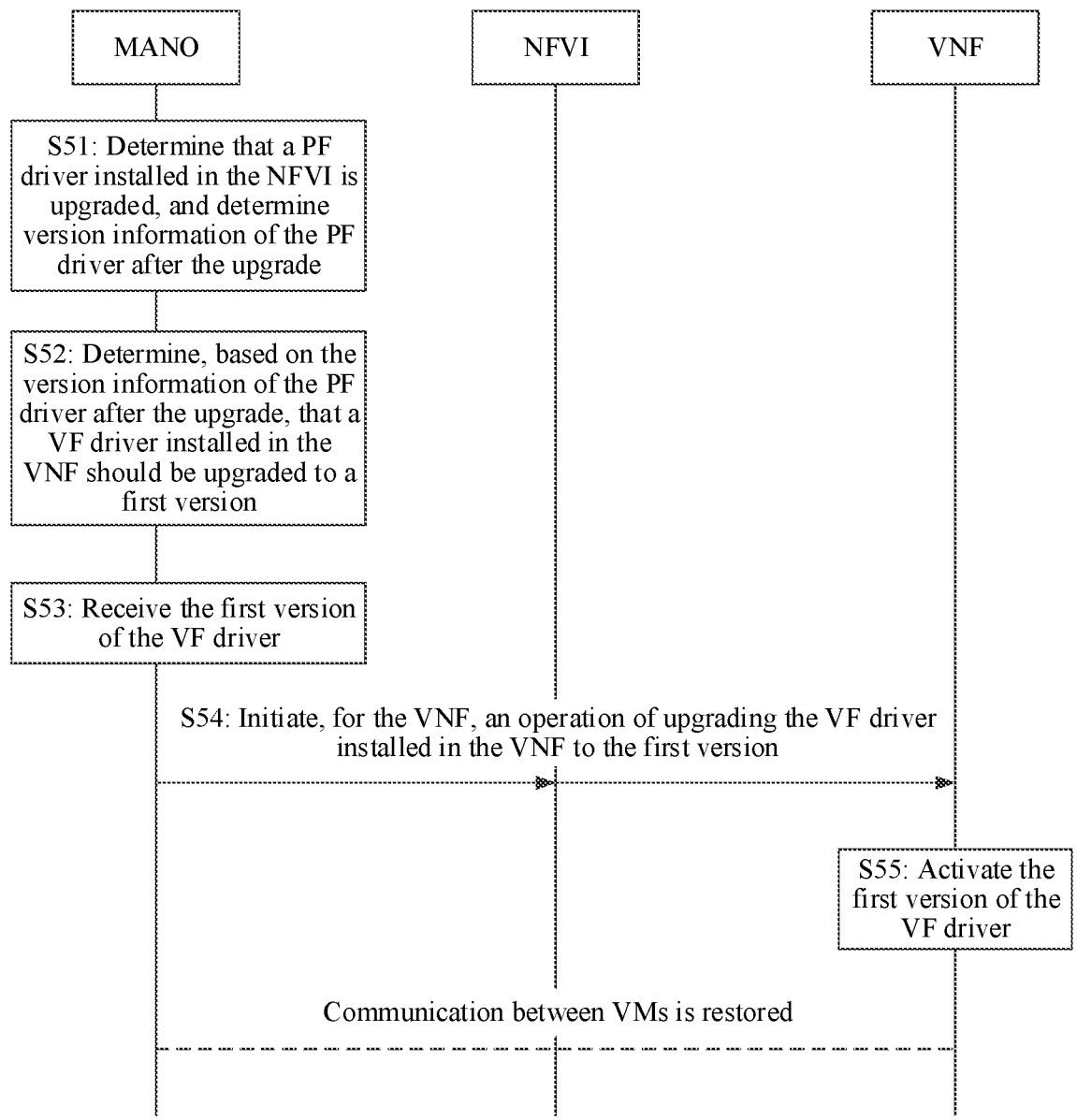
FIG. 5 is a flowchart of another driver upgrade method according to an embodiment of this application.

The VNF sometimes needs to be upgraded based on a requirement of the service or the like. For example, the VNF is upgraded in the embodiment shown in FIG. 4. According to the prior art, provided that an NFVI is upgraded, a VF driver needs to be upgraded because a PF driver has been upgraded. The VF driver is upgraded together with a VNF, and therefore the VNF also needs to be upgraded. However, in this case, the VNF may not need to be upgraded. In addition, it usually needs to take a comparatively long time to release a new version of the VNF. If the VNF is frequently upgraded, a version to which the VNF can be upgraded may not be obtained in a timely manner. In view of this, an embodiment of this application further provides a driver upgrade method. Referring to FIG. 5, in the method, a VNF may not need to be upgraded when a VF driver is upgraded. In the following description process, for example, the method is applied to the application scenario shown in FIG. 3. A procedure of the method is described as follows:

S51: MANO determines that a PF driver installed in an NFVI is upgraded, and determines version information of the PF driver after the upgrade.

In an example scenario, the NFVI is upgraded. For example, an operator or a corresponding device may complete upgrades of the PF driver and software of the NFVI by using an upgrade tool. There is a matching relationship between a version of the PF driver and a version of an operating system (OS) that runs on a physical host carried in the NFVI. The PF driver may usually be upgraded together with the version of the OS that runs on the physical host carried in the NFVI.

When interconnecting with the NFVI, the MANO may obtain some hardware information of the NFVI by using a cloud computing management platform (OpenStack), and determine the version information of the PF driver based on model and version information of a physical NIC.

In another example scenario, the NFVI is not upgraded, but the PF driver is upgraded. For example, a new board includes a physical NIC of a new model. The board carries a VM. An operator powers on the board. After the board is powered on, an operating system and some software are automatically installed. In this case, only an earlier version of the PF driver can be installed in the NFVI.

Then the operator or the corresponding device may update the PF driver on the board by using a function provided by the MANO. Currently, all mainstream NFVIs have a function of loading an NIC driver. The MANO may invoke the function of the NFVI through an interface to initiate an operation of updating the PF driver. In this case, the MANO can naturally learn of the version information of the PF driver after the upgrade. In this scenario, some of software and the like of the NFVI may be installed after the board is powered on. The earlier version of the PF driver is installed after the board is powered on, and then the PF driver is upgraded to a new version. Therefore, it may be considered that the PF driver is upgraded alone.

S52: The MANO determines, based on the version information of the PF driver after the upgrade, that a VF driver installed in a VNF should be upgraded to a first version.

After determining the version information of the PF driver after the upgrade, the MANO may determine, based on the version information of the PF driver, version information of the VF driver that matches the version information of the PF driver. For example, a version of the VF driver that matches the version of the PF driver after the upgrade is the first version.

S53: The first version of the VF driver is uploaded to the MANO, and the MANO receives the first version of the VF driver.

For example, the operator or the corresponding device may upload the first version of the VF driver to the MANO, and may add the version information of the uploaded VF driver to a VNFD. In other words, the version information of the VF driver that is added to the VNFD is information about the first version.

In this embodiment of this application, the VF driver may be separated from an image file of a VM, for example, by the VNF. In this way, the VF driver and the image file of the VM can be separately released, to facilitate independent loading of the VF driver. In S53, a separate file of the first version of the VF driver may be uploaded to the MANO, and no image file needs to be uploaded. This can reduce an amount of transmitted information.

Certainly, if the VF driver is not separated from the image file of the VM, the image file may be uploaded to the MANO in S53, where the first version of the VF driver is embedded in the image file, to complete transmission of the first version of the VF driver.

S54: The MANO initiates, for the VNF, an operation of upgrading the VF driver installed in the VNF to the first version.

It may be considered that the MANO initiates, for a related VNF based on the obtained version information of the underlying PF driver, the operation of upgrading the VF driver. The related VNF is the VNF in S54, and may include one VNF or a plurality of VNFs, for example, include all or some of VNFs, carried on the NFVI, that support an SR-IOV technology.

Figure 6A:
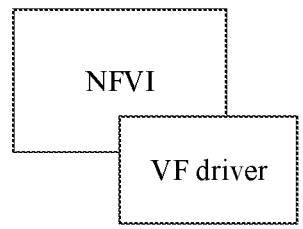
FIG. 6A to FIG. 6C are schematic diagrams of transmitting a VF driver by MANO to a VNF according to an embodiment of this application.

Specifically, the VF driver may perform format adaptation based on a loading requirement of the NFVI. The format herein is related to a type of or a channel provided by the deployed NFVI. Then the MANO may invoke an interface of the NFVI to transmit a file of the VF driver to the VNF. Referring to FIG. 6A, the VF driver is transmitted by the MANO to the NFVI, to transmit the file of the VF driver to the image file in the VNF (namely, the image file of the VM). The NFVI transmits the VF driver to the VNF. In other words, the NFVI injects the VF driver into the VNF. Currently, in terms of transmitting the VF driver to the VNF, there are two mature transmission modes: iso and tar. iso is a device injection mode, and tar is a hard disk mounting mode. In specific application, the MANO may select, based on a capability of the interconnected NFVI, the device injection mode or the hard disk mounting mode to complete transmission of the VF driver.

Figure 6B:
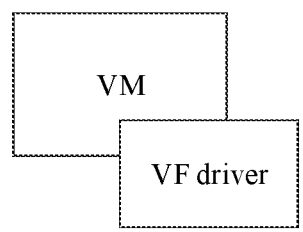

The NFVI can provide a transmission channel for the VF driver, for example, transmits the VF driver in the hard disk mounting mode. Currently, a standard OpenStack community provides a hard disk mounting capability, and some NFVIs transmit the VF driver in the device mounting mode. For example, a compact disc device is inserted into a VM through the NFVI, and a hard disk is added to the VM through the NFVI. In this case, the MANO may transmit the VF driver to the corresponding VM through the interface of the NFVI. This may be understood as that the NFVI transmits the VF driver to the corresponding VM based on an external requirement. Referring to FIG. 6B, the VF driver has been transmitted to the VNF (namely, the VM in FIG. 6B).

In addition, to ensure that the VNF can further determine whether the transmitted file of the VF driver is correct, the MANO may further send the version information of the transmitted VF driver to the VNF. In this embodiment of this application, the MANO may send, to the VNF, information indicating that the version of the transmitted VF driver is the first version, to indicate the version information of the transmitted VF driver to the VNF. After receiving the information about the first version from the MANO, the VNF may determine whether the first version is the version of the VF driver that is supported by the VNF. If the VNF determines that the VNF supports the first version, the VNF determines that the VF driver is correctly transmitted, and S55 is to be performed. If the VNF determines that the VNF does not support the first version, the VNF determines that the VF driver is incorrectly transmitted, and subsequently the VNF may not activate the first version of the VF driver.

S55: The VNF activates the first version of the VF driver.

Figure 6C:
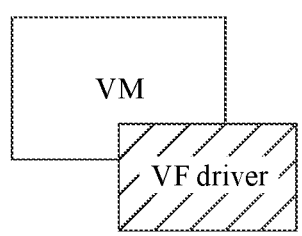

For example, after transmitting the first version of the VF driver to the VNF, the MANO may send indication information to the VNF, to indicate that the VF driver has been transmitted. After receiving the indication information from the MANO, the VNF may scan an injection device number or a directory on which a hard disk is mounted, to determine the first version of the VF driver. After determining the first version of the VF driver, the VNF may check whether the first version is a correct version of the VF driver. For example, if the first version is a version of the VF driver that is supported by the VNF, the VNF determines that the first version is the correct version of the VF driver. If the VNF determines that the first version is the correct version of the VF driver, the VNF may load the first version of the VF driver, and activate the first version of the VF driver. Referring to FIG. 6C, the VF driver has been transmitted to the VM, and slashes drawn in a box representing the VF driver indicate that the VF driver is activated. If the VNF determines that the first version is an incorrect version of the VF driver, the VNF no longer processes the first version of the VF driver.

Alternatively, a scanning script may be embedded in the VM, and periodically scans an agreed-on compact disc device or hard disk device. If it is found that a new VF driver, for example, the first version of the VF driver, is added to the compact disc device or hard disk device, the VNF may check whether the first version is a correct version of the VF driver. For example, if the first version is a version of the VF driver that is supported by the VNF, the VNF determines that the first version is the correct version of the VF driver. If the VNF determines that the first version is the correct version of the VF driver, the VNF may load the first version of the VF driver, and activate the first version of the VF driver, still referring to FIG. 6C. If the VNF determines that the first version is an incorrect version of the VF driver, the VNF no longer processes the first version of the VF driver.

After the VNF activates the first version of the VF driver, communication between VMs is restored.

In this embodiment of this application, if the PF driver is upgraded, the VF driver may be upgraded. The VNF does not need to be upgraded while the VF driver is upgraded. This reduces a time required for the upgrade, and satisfies a requirement that the PF driver matches the VF driver.

According to the solutions provided in the embodiments of this application, the upgrade of the VNF can be independent of that of the NFVI. The NFVI or VNF can be independently upgraded, no associated upgrade is required, and NFV operation and maintenance on an existing network is simplified. In addition, there is no sequence or dependency relationship between the upgrades of the VNF and the NFVI. In an operation on the existing network, the upgrade of the VNF or the NFVI may be flexibly completed based on a requirement of a service or the like.

If the VF driver is separated from the image file of the VM, the VF driver may be independently released to adapt to a plurality of NFVIs. This improves deployment flexibility of the VNF, and reduces development costs in making the VNF support a plurality of versions of NFVIs of a plurality of vendors.

An SR-IOV driver can be independently loaded, so that the VNF can quickly support a physical NIC of a new model in the market, to shorten a time to market of a service feature.

The following describes devices provided in the embodiments of this application with reference to the accompanying drawings.

Figure 7:
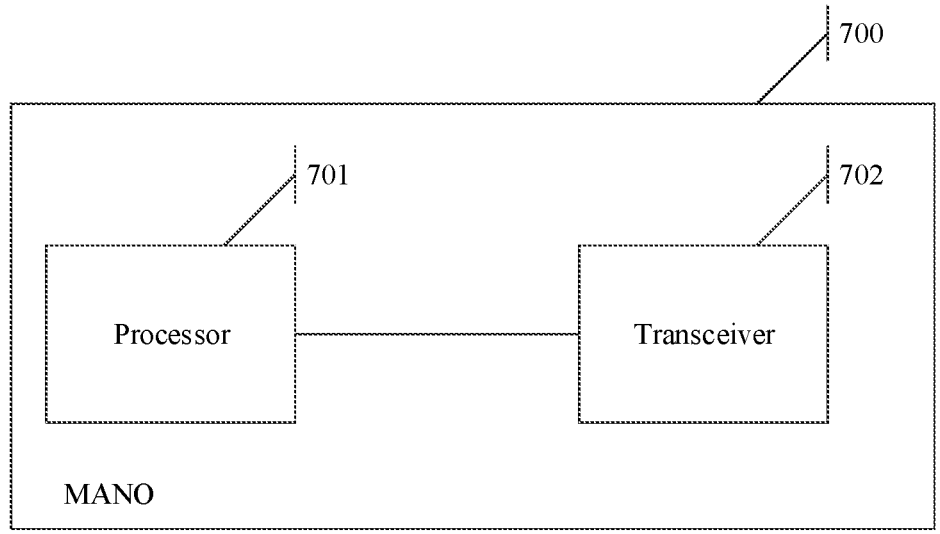
FIG. 7 is a schematic structural diagram of MANO according to an embodiment of this application.

FIG. 7 is a schematic structural diagram of MANO 700. The MANO 700 may implement functions of the MANO described above. The MANO 700 may be the MANO described above, or may be a chip disposed in the MANO described above. Optionally, the MANO 700 may include at least one module. The solution provided in the embodiment of this application may be specifically implemented by a virtualized network function manager (VNFM) in the MANO 700, or may be implemented by another module in the MANO 700. This is not limited in this embodiment of this application.

The MANO 700 may include a processor 701 and a transceiver 702. If the steps performed by the MANO in the embodiment of this application are specifically performed by the VNFM in the MANO, it may be considered that the VNFM includes the processor 701 and the transceiver 702. The processor 701 may be configured to perform S45 and S46 in the embodiment shown in FIG. 4, and/or support another process of the technology described in this specification. The transceiver 702 may be configured to perform S41, S42, S44, S46, and S47 in the embodiment shown in FIG. 4, and/or support another process of the technology described in this specification.

For example, the transceiver 702 is configured to receive first information from a VNF during an upgrade of the VNF. The first information is used to indicate version information of the VNF after the upgrade.

The processor 701 is configured to determine that a network functions virtualization infrastructure NFVI is not upgraded.

The transceiver 702 is further configured to send second information to the VNF. The second information is used to indicate to the VNF not to upgrade a VF driver installed in the VNF.

All related content of the steps in the foregoing method embodiments may be cited in function descriptions of corresponding functional modules. Details are not described herein again.

Figure 8:
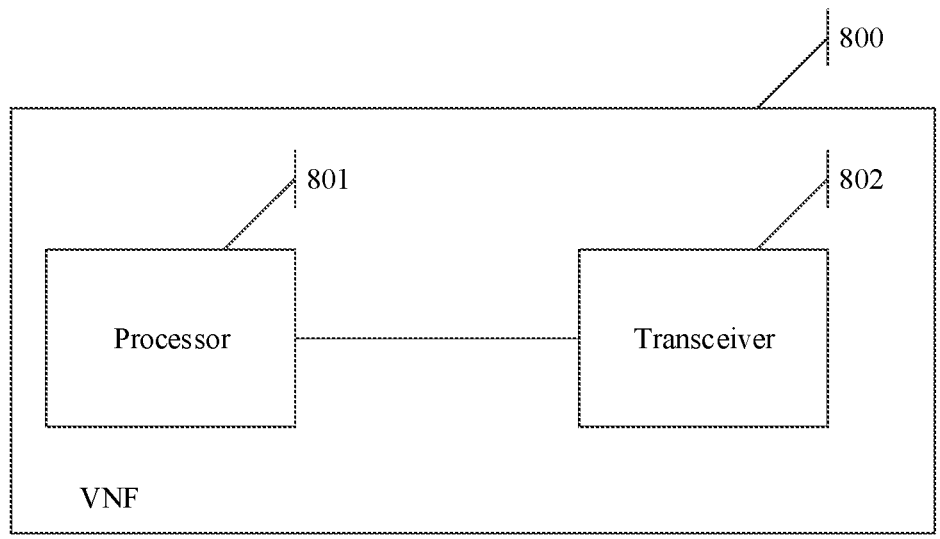
FIG. 8 is a schematic structural diagram of VNF according to an embodiment of this application.

FIG. 8 is a schematic structural diagram of a VNF 800. The VNF 800 may implement functions of the VNF described above. The VNF 800 may be the VNF described above, or may be a chip disposed in the VNF described above. The VNF 800 may include a processor 801 and a transceiver 802. The processor 801 may be configured to perform S43, S48, and S49 in the embodiment shown in FIG. 4, and/or support another process of the technology described in this specification. The transceiver 802 may be configured to perform S44 and S47 in the embodiment shown in FIG. 4, and/or support another process of the technology described in this specification.

For example, the transceiver 802 is configured to send first information to MANO during an upgrade of the VNF 800. The first information is used to indicate version information of the VNF 800 after the upgrade.

The transceiver 802 is further configured to receive second information from the MANO. The second information is used to indicate the VNF 800 not to upgrade a VF driver installed in the VNF 800.

The processor 801 is configured to activate a first version of the VF driver based on the second information. The first version is a version before the VF driver is upgraded.

All related content of the steps in the foregoing method embodiments may be cited in function descriptions of corresponding functional modules. Details are not described herein again.

Figure 9:
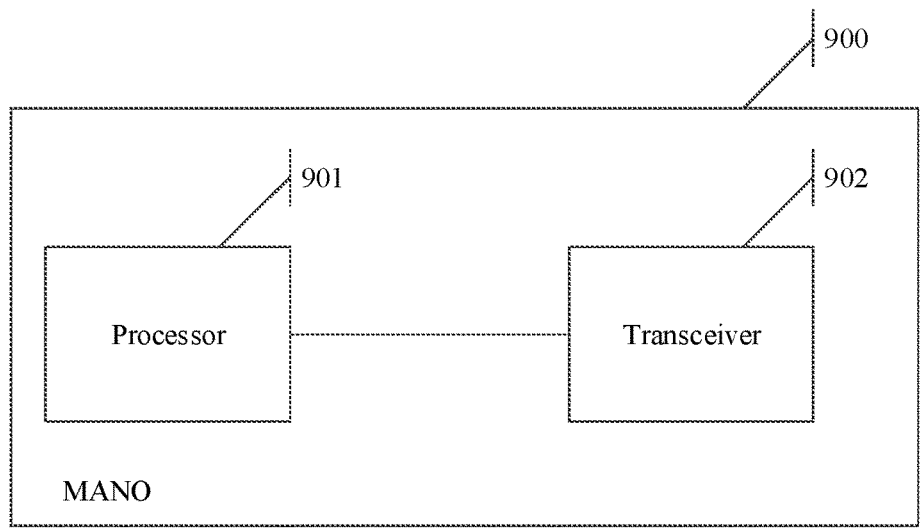
FIG. 9 is a schematic structural diagram of MANO according to an embodiment of this application.

FIG. 9 is a schematic structural diagram of MANO 900. The MANO 900 may implement functions of the MANO described above. The MANO 900 may be the MANO described above, or may be a chip disposed in the MANO described above. Optionally, the MANO 900 may include at least one module. The solution provided in the embodiment of this application may be specifically implemented by a VNFM in the MANO 900, or may be implemented by another module in the MANO 900. This is not limited in this embodiment of this application.

The MANO 900 may include a processor 901 and a transceiver 902. If the steps performed by the MANO in the embodiment of this application are specifically performed by the VNFM in the MANO, it may be considered that the VNFM includes the processor 901 and the transceiver 902. The processor 901 may be configured to perform S51, S52, and S54 in the embodiment shown in FIG. 5, and/or support another process of the technology described in this specification. The transceiver 902 may be configured to perform S53 in the embodiment shown in FIG. 5, and/or support another process of the technology described in this specification.

For example, the processor 901 is configured to determine that a PF driver installed in an NFVI is upgraded, and determine version information of the PF driver after the upgrade.

The processor 901 is further configured to determine, based on the version information of the PF driver after the upgrade, that a VF driver installed in a VNF should be upgraded to a first version.

The processor 901 is further configured to initiate, for a VNF, an operation of upgrading the VF driver installed in the VNF to the first version.

All related content of the steps in the foregoing method embodiments may be cited in function descriptions of corresponding functional modules. Details are not described herein again.

Figure 10A:
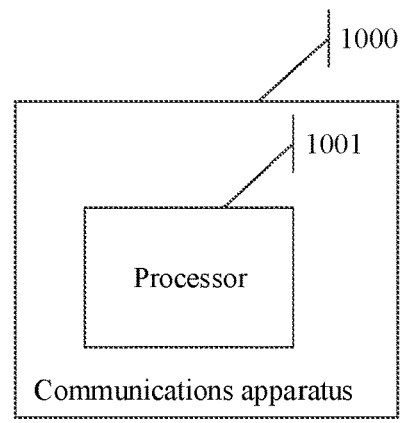
FIG. 10A and FIG. 10B are schematic diagrams of two structures of a communications apparatus according to an embodiment of this application.

In a simple embodiment, a person skilled in the art may figure out that the MANO 700, the VNF 800, or the MANO 900 may alternatively be implemented by a structure of a communications apparatus 1000 shown in FIG. 10A. The communications apparatus 1000 may implement functions of the MANO or the VNF described above. The communications apparatus 1000 may include a processor 1001. When the communications apparatus 1000 is configured to implement functions of the MANO in the embodiment shown in FIG. 4, the processor 1001 may be configured to perform S45 and S46 in the embodiment shown in FIG. 4, and/or support another process of the technology described in this specification. When the communications apparatus 1000 is configured to implement functions of the VNF in the embodiment shown in FIG. 4, the processor 1001 may be configured to perform S43, S48, and S49 in the embodiment shown in FIG. 4, and/or support another process of the technology described in this specification. When the communications apparatus 1000 is configured to implement functions of the MANO in the embodiment shown in FIG. 5, the processor 1001 may be configured to perform S51, S52, and S54 in the embodiment shown in FIG. 5, and/or support another process of the technology described in this specification.

The communications apparatus 1000 may be implemented by a field-programmable gate array (FPGA), a application specific integrated circuit (ASIC), a system on chip (SoC), a central processing unit (CPU), a network processor (NP), a digital signal processor (DSP), a micro controller unit (MCU), a programmable logic device (PLD), or another integrated chip. The communications apparatus 1000 may be disposed in the network device or the communications device in the embodiments of this application, so that the network device or the communications device implements the message transmission method provided in the embodiments of this application.

Figure 10B:
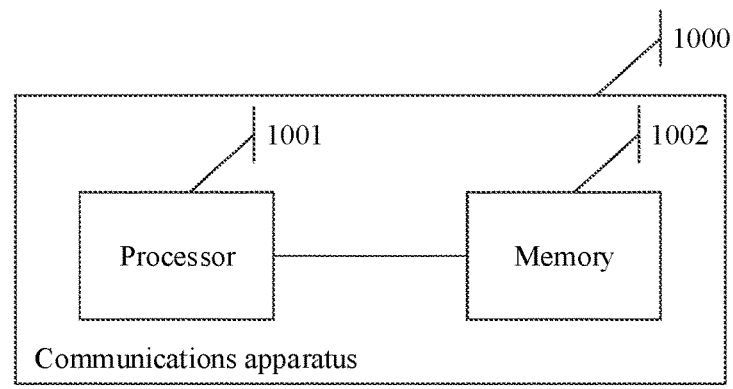

In an optional implementation, referring to FIG. 10B, the communications apparatus 1000 may further include a memory 1002. The memory 1002 is configured to store a computer program or an instruction. The processor 1001 is configured to decode and execute the computer program or the instruction. It should be understood that the computer program or the instruction may include a functional program of the foregoing MANO or VNF. When the processor 1001 decodes and executes the functional program of the MANO, the MANO can be enabled to implement the functions of the MANO in the method provided in the embodiment shown in FIG. 4 or FIG. 5 in the embodiments of this application. When the processor 1001 decodes and executes the functional program of the VNF, the VNF can be enabled to implement the functions of the VNF in the method provided in the embodiment shown in FIG. 4 or FIG. 5 in the embodiments of this application.

In another optional implementation, the functional program of the MANO or the VNF is stored in a memory outside the communications apparatus 1000. When the processor 1001 decodes and executes the functional program of the MANO, the memory 1002 temporarily stores some or all content of the functional program of the MANO. When the processor 1001 decodes and executes the functional program of the VNF, the memory 1002 temporarily stores some or all content of the functional program of the VNF.

In still another optional implementation, the functional program of the MANO or the VNF is stored in the memory 1002 inside the communications apparatus 1000. When the functional program of the MANO is stored in the memory 1002 inside the communications apparatus 1000, the communications apparatus 1000 may be disposed in the MANO in the embodiment of this application. When the functional program of the VNF is stored in the memory 1002 inside the communications apparatus 1000, the communications apparatus 1000 may be disposed in the VNF in the embodiment of this application.

In yet another optional implementation, some content of the functional program of the MANO is stored in a memory outside the communications apparatus 1000, and the other content of the functional program of the MANO is stored in the memory 1002 inside the communications apparatus 1000. Alternatively, some content of the functional program of the VNF is stored in a memory outside the communications apparatus 1000, and the other content of the functional program of the VNF is stored in the memory 1002 inside the communications apparatus 1000.

In the embodiments of this application, the MANO 700, the VNF 800, the MANO 900, and the communications apparatus 1000 each are divided into functional modules based on corresponding functions, or may each be divided into functional modules in an integrated manner. The "module" herein may be an ASIC, a processor and a memory that execute one or more software or firmware programs, an integrated logic circuit, and/or another component that can provide the foregoing functions.

In addition, the MANO 700 provided in the embodiment shown in FIG. 7 may alternatively be implemented in another form. For example, the MANO 700 includes a processing module and a transceiver module. For example, the processing module may be implemented by the processor 701, and the transceiver module may be implemented by the transceiver 702. The processing module may be configured to perform S45 and S46 in the embodiment shown in FIG. 4, and/or support another process of the technology described in this specification. The transceiver module may be configured to perform S41, S42, S44, S46, and S47 in the embodiment shown in FIG. 4, and/or support another process of the technology described in this specification.

For example, the transceiver module is configured to receive first information from a VNF during an upgrade of the VNF. The first information is used to indicate version information of the VNF after the upgrade.

The processing module is configured to determine that a network functions virtualization infrastructure NFVI is not upgraded.

The transceiver module is further configured to send second information to the VNF. The second information is used to indicate the VNF not to upgrade a VF driver installed in the VNF.

All related content of the steps in the foregoing method embodiments may be cited in function descriptions of corresponding functional modules. Details are not described herein again.

The VNF 800 provided in the embodiment shown in FIG. 8 may alternatively be implemented in another form. For example, the VNF 800 includes a processing module and a transceiver module. For example, the processing module may be implemented by the processor 801, and the transceiver module may be implemented by the transceiver 802. The processing module may be configured to perform S43, S48, and S49 in the embodiment shown in FIG. 4, and/or support another process of the technology described in this specification. The transceiver module may be configured to perform S44 and S47 in the embodiment shown in FIG. 4, and/or support another process of the technology described in this specification.

For example, the transceiver module is configured to send first information to MANO during an upgrade of the VNF 800. The first information is used to indicate version information of the VNF 800 after the upgrade.

The transceiver module is further configured to receive second information from the MANO. The second information is used to indicate the VNF 800 not to upgrade a VF driver installed in the VNF 800.

The processing module is configured to activate a first version of the VF driver based on the second information. The first version is a version before the VF driver is upgraded.

The MANO 900 provided in the embodiment shown in FIG. 9 may alternatively be implemented in another form. For example, the MANO 900 includes a processing module and a transceiver module. For example, the processing module may be implemented by the processor 901, and the transceiver module may be implemented by the transceiver 902. The processing module may be configured to perform S51, S52, and S54 in the embodiment shown in FIG. 5, and/or support another process of the technology described in this specification. The transceiver module may be configured to perform S53 in the embodiment shown in FIG. 5, and/or support another process of the technology described in this specification.

For example, the processing module is configured to determine that a PF installed in an NFVI is upgraded, and determine version information of the PF driver after the upgrade.

The processing module is further configured to determine, based on the version information of the PF driver after the upgrade, that a VF driver should be upgraded to a first version.

The processing module is further configured to initiate, for a VNF, an operation of upgrading the VF driver installed in the VNF to the first version.

All related content of the steps in the foregoing method embodiments may be cited in function descriptions of corresponding functional modules. Details are not described herein again.

The MANO 700, the VNF 800, the MANO 900, and the communications apparatus 1000 provided in the embodiments of this application may be configured to perform the method provided in the embodiment shown in FIG. 4 or FIG. 5. Therefore, for technical effects that can be achieved by the MANO 700, the VNF 800, the MANO 900, and the communications apparatus 1000, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Definitely, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A driver upgrade method, comprising: receiving, by a network functions virtualization management and orchestration (MANO), first information from a virtualized network function (VNF) during an upgrade of the VNF, the first information indicating upgrade version information of the VNF; determining, by the MANO, that a network functions virtualization infrastructure (NFVI) is not upgraded with the VNF being upgraded; and sending, by the MANO, second information to the VNF, the second information indicating to the VNF not to upgrade a virtual function (VF) driver installed in the VNF with the VNF being upgraded.

2. The method according to claim 1, further comprising, before the receiving of the first information, uploading, by the MANO, a new version of an image file to the VNF, wherein the VF driver is not embedded in the new version of the image file.

3. The method according to claim 1, further comprising, after the receiving of the first information, updating, by the MANO, a matching relationship between a virtualized network function descriptor (VNFD) and the VNF, wherein the VNFD matches the VNF in the updated matching relationship.

4. A driver upgrade method, comprising: sending, by a virtualized network function VNF, first information to a network functions virtualization management and orchestration (MANO) during an upgrade of the VNF, the first information indicating upgrade version information of the VNF; receiving, by the VNF, second information from the MANO, the second information indicating to the VNF not to upgrade a virtual function VF driver installed in the VNF with the VNF being upgraded; and activating, by the VNF, a first version of the VF driver based on the second information, wherein the first version is a version of the VF driver before an upgrade to the VF driver.

5. The method according to claim 4, wherein the second information carries information about a second version, the second version is a version of a physical function PF driver installed in an NFVI, and the activating, by the VNF, of the first version of the VF driver comprises: determining, by the VNF, the first version that is in one or more versions of the VF driver and that matches the second version; and activating, by the VNF, the first version of the VF driver.

6. The method according to claim 4, further comprising, before the sending of the first information, receiving, by the VNF, a new version of an image file from the MANO, wherein the VF driver is not embedded in the new version of the image file.

7. A driver upgrade method, comprising: determining, by a network functions virtualization management and orchestration (MANO), that a physical function (PF) driver installed in a network functions virtualization infrastructure (NFVI) is upgraded, and determining upgrade version information of the PF driver; determining, by the MANO based on the version information of the PF driver after the upgrade, that a virtual function (VF) driver installed in a virtualized network function (VNF) should be upgraded to a first version independently of an upgrade of the VNF; and initiating, by the MANO for the VNF, an operation of upgrading the VF driver installed in the VNF to the first version.

8. The method according to claim 7, wherein the determining, by MANO, that the PF driver installed in an NFVI is upgraded comprises: determining, by the MANO, that the NFVI is upgraded; or determining, by the MANO, that the NFVI is not upgraded, but the PF driver is upgraded.

9. The method according to claim 7, further comprising adding, by the MANO, information about the first version to a virtualized network function descriptor VNFD.

10. A network functions virtualization management and orchestration (MANO), comprising: a transceiver, configured to receive first information from a virtualized network function (VNF) during an upgrade of the VNF, the first information indicating upgrade version information of the VNF; and a processor configured to determine that a network functions virtualization infrastructure (NFVI) is not upgraded with the VNF being upgraded, wherein the transceiver is further configured to send second information to the VNF, the second information indicating to the VNF not to upgrade a virtual function (VF) driver installed in the VNF with the VNF being upgraded.

11. The MANO according to claim 10, wherein the transceiver is further configured to: before receiving the first information from the VNF, upload a new version of an image file to the VNF, wherein the VF driver is not embedded in the new version of the image file.

12. The MANO according to claim 10, wherein the processor is further configured to, after the transceiver receives the first information from the VNF, update a matching relationship between a virtualized network function descriptor (VNFD) and the VNF, wherein the VNFD matches the VNF in the updated matching relationship.

13. A virtualized network function (VNF) manager, comprising: a transceiver, configured to send first information to a network functions virtualization management and orchestration (MANO) during an upgrade of the VNF, the first information indicating upgrade version information of the VNF, and to receive second information from the MANO, the second information indicating to the VNF not to upgrade a virtual function (VF) driver installed in the VNF with the VNF being upgraded; and a processor configured to activate a first version of the VF driver based on the second information, wherein the first version is a version before an upgrade to the VF driver.

14. The VNF manager according to claim 13, wherein the second information carries information about a second version, the second version is a version of a physical function (PF) driver installed in an NFVI, and wherein the processor activates the first version after determining that the first version that is in one or more versions of the VF driver matches the second version.

15. The VNF manager according to claim 13, wherein the transceiver is further configured to, before sending the first information to the MANO, receive a new version of an image file from the MANO, wherein the VF driver is not embedded in the new version of the image file.

16. A network functions virtualization management and orchestration (MANO), comprising a processor coupled to a memory, the processor executing instructions stored in the memory to: determine that a physical function (PF) driver installed in a network functions virtualization infrastructure (NFVI) is upgraded; determine upgrade version information of the PF driver; determine, based on the version information of the PF driver after the upgrade, that a virtual function (VF) driver should be upgraded to a first version of the VF driver independently of an upgrade of a virtualized network function (VNF); and initiate, for the VNF, an operation of upgrading the VF driver installed in the VNF to the first version.

17. The MANO according to claim 16, wherein the processor further executes the instructions to: determine that the NFVI is upgraded; or determine that the NFVI is not upgraded, but the PF driver is upgraded.

18. The MANO according to claim 16, wherein the processor further executes the instructions to: add information about the first version to a virtualized network function descriptor VNFD.

* * * * *